Whitworth & Hawkins,
Cutter Head.

No. 3,040. Reissued June 14, 1868.

Witnesses

W. A. Burridge
E. E. Waite

Inventors:

John Whitworth
W. H. Hawkins

N. PETERS, PHOTO-LITHOGRAPHER, WASHINGTON, D. C.

United States Patent Office.

JOHN WHITWORTH AND WILLIAM H. HAWKINS, OF CLEVELAND, OHIO, ASSIGNEES OF JOHN WHITWORTH.

*Letters Patent No.* 71,670, *dated December* 3, 1867; *reissue No.* 3,040, *dated July* 14, 1868.

IMPROVEMENT IN CUTTERS FOR WOOD-MOULDINGS.

The Schedule referred to in these Letters Patent and making part of the same.

TO ALL WHOM IT MAY CONCERN:

Be it known that I, JOHN WHITWORTH, of Cleveland, in the county of Cuyahoga, and State of Ohio, have invented certain new and useful Improvements in Cutter-Heads for Mouldings, &c., and that I have sold and assigned one undivided half interest in said patent to WILLIAM H. HAWKINS, of Cleveland, Ohio, and we are the sole and legal owners of said patent; and we do hereby declare that the following is a full and complete description of the same, reference being had to the accompanying drawings, making a part of this specification, in which—

Figure 1:
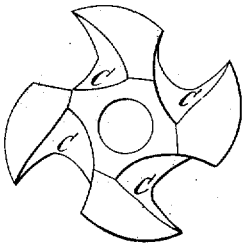

Figure 1 is a view of the under side of the cutter.

Figure 2:
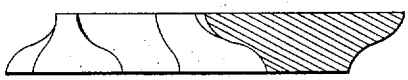
Figure 7:
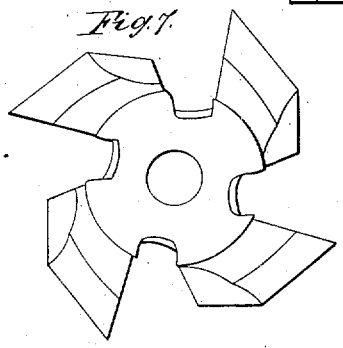

Figure 2, a view of the edge.

Figure 3:
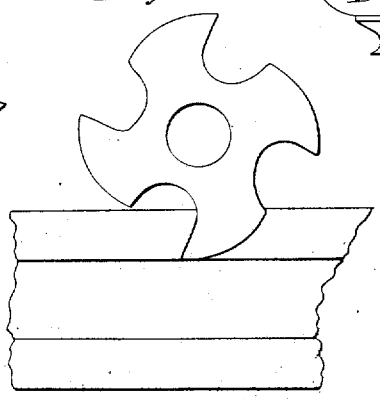

Figure 3, a view showing the position of the cutter in relation to the work.

Figures 4, 5, 6, and 7, represent a cutter of different forms.

Like letters of reference refer to like parts in the different views.

Fig. 1 represents a hard or chilled cast-iron cutter for cutting beads, mouldings, &c., for picture-frames, ornamental work, or for any like purposes for which mouldings are ordinarily used, and which may be of any size or style required.

Cutters in common use for this purpose are made of steel, finished up and tempered with great care and skill, in order to obtain a good and durable cutting-edge.

Notwithstanding the care and skill exercised, these cutters soon become dull, making the work rough and uneven, and more especially is this the case when the timber is hard, curled, or knotty.

The time and labor spent in repairing and refitting the worn cutters, render them not only expensive, but in consequence of being so frequently sharpened, they become variable in shape and irregular in size.

In order to avoid this difficulty, labor, and expense, the cutter is made of hard or chilled cast iron, which experience has shown can be brought to a fine cutting-edge, lasting much longer than steel, and greatly less expensive. Steel cutters require sharpening every few hours, whereas these need sharpening but once in several days.

The manner of making these cutters is by simply forming a pattern of the size and style of moulding required, and casting them in suitable moulds or chills, and then grinding them on stones and emery-wheels constructed for the purpose. The moulds are so constructed that the bias of the cutting-edge falls back from the edge, thereby throwing the chips off from the work or timber to one side, instead of down upon it, as do the cutters in ordinary use.

Fig. 3 shows the position of the cutter while in use, A being the cutter and B the moulding or timber.

Figure 4:
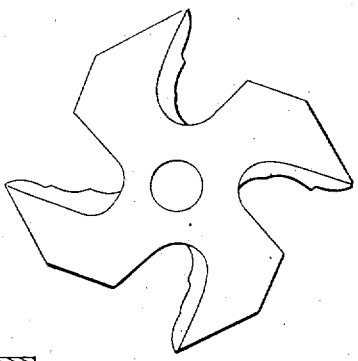
Figure 6:
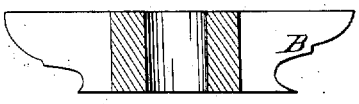
Figure 5:
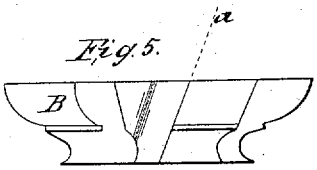

These cutters are sharpened by dressing or grinding the bias of the cutting-edge C, thus leaving the curves of the work unchanged. Hence, as the cutting-edge may wear back it will still retain its original size and shape. Fig. 5 shows the cutter with the angle of the bias receding from the cutting-edge, which is preferred, and will therefore throw the chips in the direction of the dotted line *a*, whereas the bias of the angle of the cutter A, fig. 1, is the reverse, and hence will throw the chips from the opposite side from that of fig. 5, and of which fig. 4 is a side view.

What I claim as my invention, and desire to secure by Letters Patent, is—

The herein-described hard or chilled cast-iron rotary cutter for working wood, made in the manner as and for the purpose substantially set forth, as a new article of manufacture.

JOHN WHITWORTH,
WM. H. HAWKINS.

Witnesses:
GEO. HESTER,
J. H. BURRIDGE.